(12) United States Patent
Shin et al.

(10) Patent No.: US 7,542,785 B2
(45) Date of Patent: Jun. 2, 2009

(54) METHOD FOR SETTING UP THEME PICTURES AND RINGING TONES OF A MOBILE TELECOMMUNICATION TERMINAL

(75) Inventors: Keun Hee Shin, Seoul (KR); In Seong Hwang, Seoul (KR); Hee Won Park, Seoul (KR); Sang Ho Chae, Seoul (KR); Chang Ho Choi, Gyeonggi-do (KR); Won Hee Sull, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 805 days.

(21) Appl. No.: 10/496,258

(22) PCT Filed: Nov. 22, 2002

(86) PCT No.: PCT/KR02/02189

§ 371 (c)(1),
(2), (4) Date: Oct. 6, 2004

(87) PCT Pub. No.: WO03/045091

PCT Pub. Date: May 30, 2003

(65) Prior Publication Data

US 2006/0250496 A1     Nov. 9, 2006

(30) Foreign Application Priority Data

Nov. 23, 2001   (KR)   ................ 10-2001-0073235

(51) Int. Cl.
*H04M 1/00* (2006.01)
(52) U.S. Cl. ............... 455/566; 455/556.1; 455/567; 455/412.1; 455/414.2
(58) Field of Classification Search ............... 455/566, 455/556.1, 567, 412.1, 414.2
See application file for complete search history.

(56) References Cited

U.S. PATENT DOCUMENTS 6,473,628 B1 * 10/2002 Kuno et al. ............... 455/566
6,775,557 B2 *  8/2004 Tsai ....................... 455/556.1
6,848,011 B2 *  1/2005 Park et al. .................. 710/14

(Continued)

FOREIGN PATENT DOCUMENTS

EP        0831629 A2      3/1998

(Continued)

*Primary Examiner*—Nay A Maung
*Assistant Examiner*—Ping Y Hsieh
(74) *Attorney, Agent, or Firm*—Lowe Hauptman Ham & Berner, LLP

(57) ABSTRACT

In a method for setting up theme pictures and bells of a mobile telecommunication terminal, contents data stored in a storage unit of the mobile telecommunication terminal are retrieved based on a user's setting of a theme picture and a bell. A selection window is provided to the user to select the retrieved contents data. It is to determine whether the contents data selected in the selection window are VOD contents. If the contents data are the VOD contents data, at least one among video and audio data including the VOD contents data is decoded. A setup window is provided to determine whether the theme pictures include the decoded audio data. A speaker of the mobile telecommunication terminal is controlled on or off based on a user's setting of the setup window when the theme pictures are set up.

4 Claims, 4 Drawing Sheets

U.S. PATENT DOCUMENTS 7,319,866 B2 * 1/2008 Shanahan .................. 455/419

FOREIGN PATENT DOCUMENTS

| EP | 1011248 A2 | 6/2000 |
| --- | --- | --- |
| KR | 1020000000422 | 1/2000 |
| WO | WO 98/19480 A2 | 5/1998 |
| WO | WO 01/24507 A1 | 4/2001 |
| WO | 01/33856 | 5/2001 |

* cited by examiner

METHOD FOR SETTING UP THEME PICTURES AND RINGING TONES OF A MOBILE TELECOMMUNICATION TERMINAL

FIELD OF THE INVENTION

The present invention relates to theme pictures and bells of a mobile telecommunication terminal; and, more particularly, to a method for setting up theme pictures and bells of a mobile telecommunication terminal by using video on demand (VOD) contents.

BACKGROUND OF THE INVENTION

Current wireless telecommunication network is on the rise, fueled by an increase in the number of wireless communication users, surpassing growth of any other medium (a radio, a TV, a cable network or the like). Further, the wireless telecommunication network offers enormous potential for growth and even greater demand. Such wireless telecommunication network offers the users, downloads of various contents such as picture files, music files, and the like. Moreover, the users can utilize the downloaded contents, in setting up theme pictures to be displayed during a standby status of a mobile telecommunication terminal or bells for indicating an incoming call.

Such downloaded contents for use in theme pictures and bells having simple frames entail a limitation in applications of animation. However, increasing capabilities of technology as can be seen in a real-time transmission of motion picture, a location tracking, a voice recognition or the like developed recently offer a variety of high quality multimedia (VOD contents) services in the wireless network. Such multimedia services through the wireless communication network is offered through a third generation mobile terminal, i.e., IMT-2000, capable of implementing high speed wireless multimedia services. Such mobile terminal incorporates a WAP browser and a VOD player, so that multimedia-related data can be downloaded and played.

Meanwhile, a research and development is being undertaken to provide utilization of the downloaded high quality multimedia data as theme pictures, bells, and other services.

SUMMARY OF THE INVENTION

It is, therefore, an object of the present invention to provide a method for setting up theme pictures and bells of a mobile telecommunication terminal, wherein the terminal decodes audio and video data included in VOD contents data downloaded through a wireless network and controls a speaker therein when the decoded data are set up as theme pictures.

In accordance with a preferred embodiment of the present invention, there is provided a method for setting up theme pictures and bells of a mobile telecommunication terminal, including the steps of:

(a) retrieving contents data stored in a storage unit of the mobile telecommunication terminal and providing a selection window for a user to select the retrieved contents data, upon receiving request from the user to change settings for theme picture and bells;

(b) determining whether the contents data selected in the selection window are VOD contents data;

(c) decoding at least one of video and audio data included in the VOD contents data, if the VOD contents data are selected;

(d) providing a setup window for determining whether or not the theme pictures and bells include the decoded audio data; and (e) turning on or off a speaker of the mobile telecommunication terminal based on the user's setting of the setup window when the theme pictures and bells are set up.

In accordance with another preferred embodiment of the present invention, there is provided a method for setting up theme pictures and bells of a mobile telecommunication terminal, including the steps of:

(a) determining a user's requests to set up the theme pictures or the bells and detecting VOD contents therein;

(b) deciding whether audio data included in the VOD contents are selected to be used to set up the theme pictures, upon the user requesting to enter set up of the theme pictures and selecting the VOD contents, and deciding whether video data included in the VOD contents are selected to be used to set up the bells, upon the user requesting to set up the bells and selecting the VOD contents;

(c) turning on the speaker during the theme pictures set up, if the audio data are selected to be used with the theme pictures, otherwise, turning the speaker off; and (d) processing/decoding the video data included in the VOD contents to be displayed when the user receives an incoming call, if the video data are selected to be used in setting up the bell, otherwise, processing/decoding the VOD data excluding the video data.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

There may exist a plurality of preferred embodiments and the preferred embodiments will be described in detail with reference to the accompanying drawings. The objects and features of the present invention will become apparent to those skilled in the art through the preferred embodiments.

Figure 1:
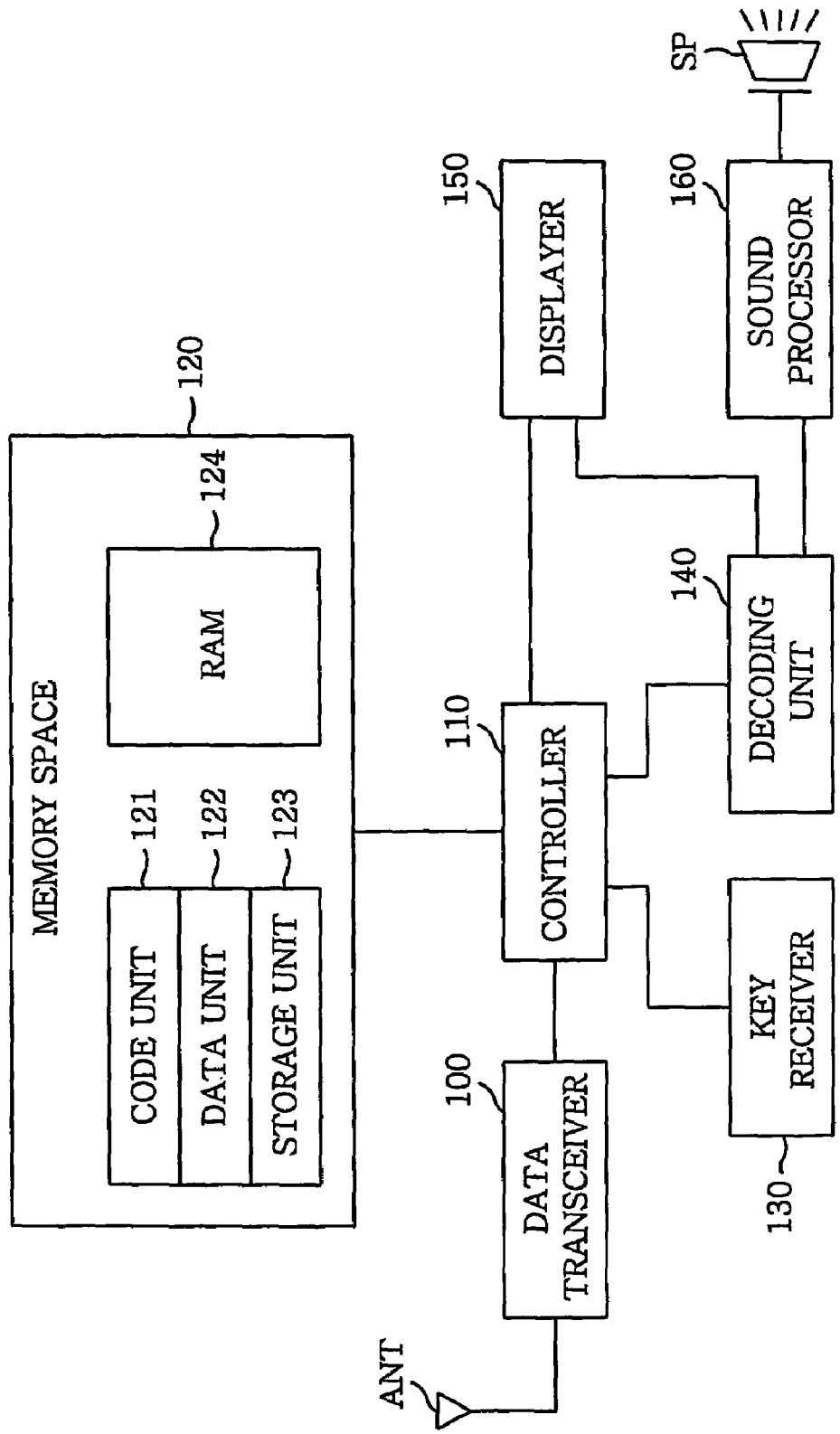
FIG. 1 shows a diagram of an inner composition of a mobile telecommunication terminal employed in the present invention.
Figure 2:
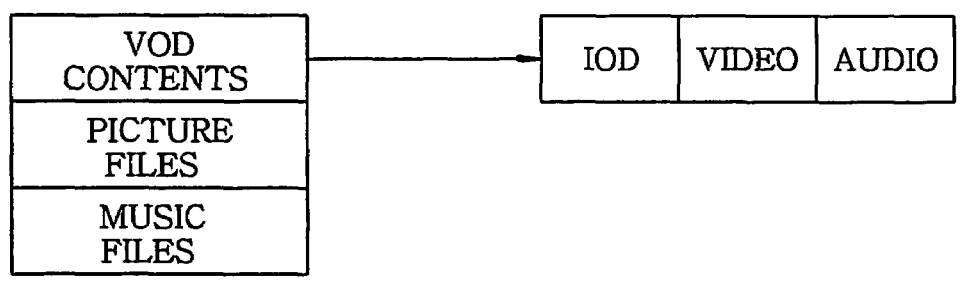
FIG. 2 describes a detailed drawing for showing a storage unit of the mobile telecommunication terminal of FIG. 1.
Figure 3:
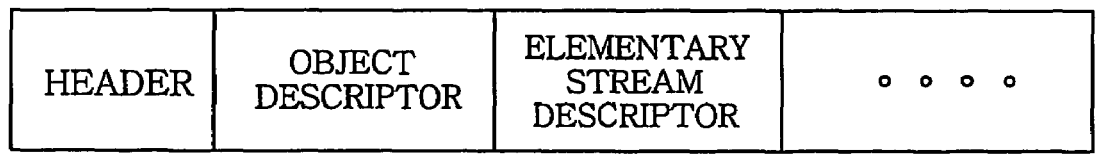
FIG. 3 provides a detailed drawing of a structure of an IOD field in VOD contents data shown in FIG. 2.

FIG. 1 shows a block diagram for illustrating an inner composition of a mobile telecommunication terminal in accordance with the present invention. FIG. 2 describes a detailed drawing for showing a storage unit in accordance with the present invention. FIG. 3 provides a detailed drawing for illustrating an IOD field of video on demand (VOD) contents shown in FIG. 2.

The mobile telecommunication terminal includes a data transceiver 100, a controller 110, a memory space 120, a key receiver 130, a decoding unit 140, a display 150, a sound processor 160, a speaker (SP), and an antenna (ANT).

The data transceiver 100 downloads VOD contents for use in theme pictures, bells, and the like through the antenna (ANT) in a wireless markup language (WML) script, and stores the downloaded contents in the memory space 120 through the controller 110. The WML script containing information on the VOD contents has a svcType field value, which is an identifier for identifying the VOD contents. Such svcType field value which is identified by the controller is assigned a value, i.e., PM or BD, wherein PM indicates the VOD contents for use in theme pictures, whereas BD indicates the VOD contents for use in bells.

The memory space 120, which is used for storing the VOD contents transmitted from the controller 110, is divided into a flash ROM and a RAM 124. The flash ROM includes a code unit 121, a data unit 122, and a storage unit 123. The code unit 121 stores programs (e.g., a VOD player, a wireless application protocol (WAP) browser or the like) for providing basic functions and additional services of the mobile telecommunication terminal. The data unit 122 stores variables and data needed for executing the programs stored in the code unit 121. The storage unit 123 stores VOD contents downloaded in the data transceiver 100. The RAM 124 is used for carrying out general programs, e.g., a vibration driver, a sound driver, and a display driver, necessary in operating the mobile telecommunication terminal.

As shown in FIG. 2, data stored in the storage unit 123 is categorized into VOD contents, picture files, and audio files. The picture files may be used as theme pictures during a standby status of the mobile telecommunication terminal and the audio files may be used as bells indicating an incoming call. Since the VOD contents are multimedia contents having audio and video data, they may be used for theme pictures and bells. Moreover, the VOD contents may be played by a VOD player based on a user's demand.

The VOD contents are stored in the storage unit 123 in an intermediate file format, wherein the intermediate file format has an IOD field containing information for decoding and synchronizing video, audio streams, and respective multimedia data thereof. As illustrated in FIG. 3, the IOD field includes a header (16-bit), an object descriptor, and an elementary stream descriptor (ESD).

Further, the IOD field of the VOD contents contains an svcType field value, i.e., PM or BD, as mentioned above.

The key receiver 130 provides signals to the controller 110, wherein the signals are generated by menu selections and key operations of a user and calls.

The controller 110 displays a menu selection window regarding a theme picture setup, a bell setup, and VOD contents in the display 150. The controller 110 receives through the key receiver 130 the signal generated by the menu selection of the user and then processes a corresponding instruction. Then, the controller 110 identifies whether the received data are VOD contents data or general data based on a file type of the data received from the data transceiver 100. Next, the identified data are stored in a corresponding area of the storage unit 123.

The data selected by the user in the menu selection window are retrieved from the storage unit 123 and then displayed in the display 150. In case the user selects VOD contents, the VOD contents data corresponding to the VOD contents are transmitted to the decoding unit 140. The decoding unit 140 decodes audio and video data included in the VOD contents data.

An operational process of the controller 110 for setting up theme pictures of the terminal by using the VOD contents is described as follows.

The controller 110 provides a selection window and a setup window on the display 150. The selection window is provided for the user to select the video data in the VOD contents data to be used in setting up a theme picture. The setup window is provided to determine whether audio data in the VOD contents data decoded by the decoding unit 140 are to be used for setting up the theme picture. An output of a speaker (SP) is thereby controlled by the selection made by the user in the setup window. Such being the case, if the user does not select the audio data included in the VOD contents data, the speaker (SP) output is turned off by the controller 110, during the theme picture set up. On the other hand, if the user selects the audio data for the theme picture, the speaker (SP) output is turned on by the controller 110 during the theme picture set up.

The decoding unit 140 decodes picture files for use in theme pictures and audio files for use in bells chosen by a user. In case the data chosen by the user are VOD contents, the decoding unit 140 decodes the audio data or the video data included in the VOD contents based on the user's selection. Next, the decoded data are transmitted to the speaker (SP) (as a bell for indicating an incoming call) through the sound processor 160 or displayed in the display 150 (as the theme picture during the standby status of the mobile telecommunication terminal).

Further, a decoder used in the decoding unit 140 is able to reproduce the audio data that are high quality data included in the VOD contents and also support, for example, a 128-bit sound source.

The sound processor 160 processes the audio data transmitted from the decoding unit 140, and sends the processed data to the speaker (SP), wherein the audio file set up as bells is transmitted to the speaker (SP) when the mobile telecommunication terminal of the user receives an incoming call.

A process of setting up theme pictures by using VOD contents in above-described mobile telecommunication terminal is described as follows.

Figure 4A:
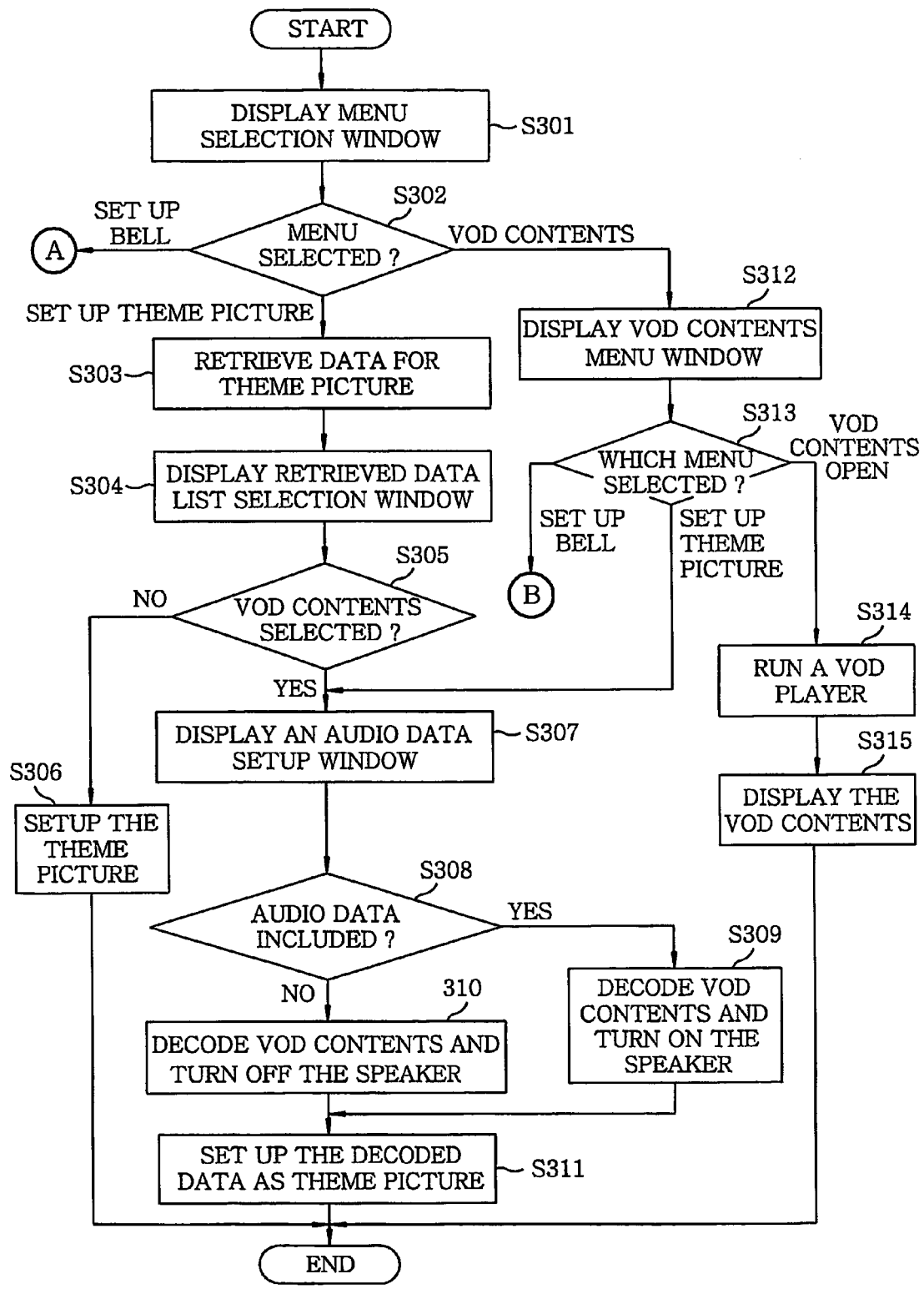
FIGS. 4A and 4B depict a flow chart for showing a process for setting up theme pictures and bells of a mobile telecommunication terminal in accordance with a preferred embodiment of the present invention.
Figure 4B:
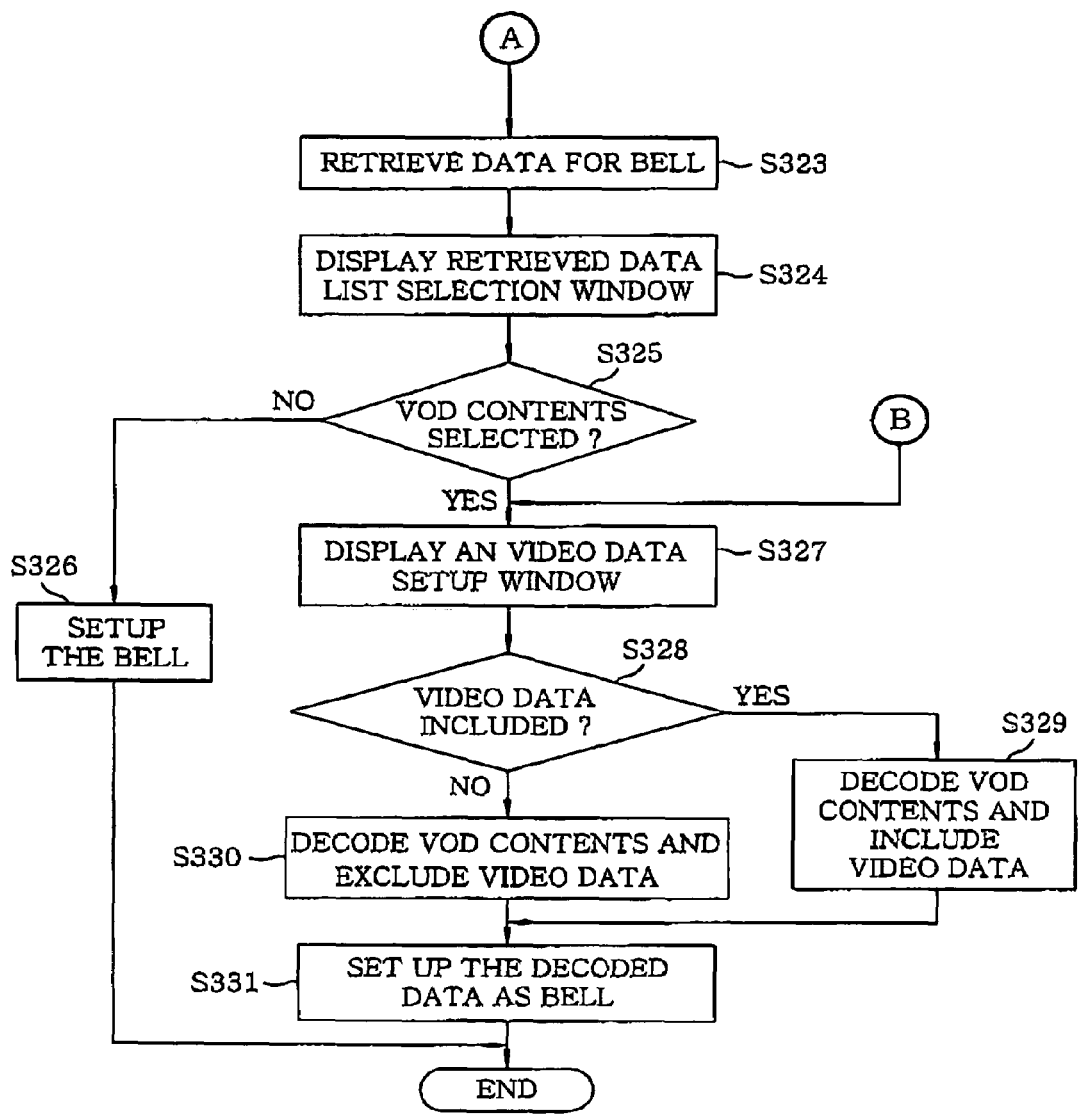

FIGS. 4A and 4B depict a flow chart for setting up theme pictures of a mobile telecommunication terminal by using the VOD contents in accordance with a preferred embodiment of the present invention.

A user connects a mobile telecommunication terminal to a VOD server or a contents provider through a wireless network to download desired VOD contents, picture files, audio files or the like. The data transceiver 100 transmits data received through the antenna (ANT) to the controller 110. Next, the transmitted data are read by the controller 110, and stored in a corresponding data location in the storage unit 123, wherein the controller 110 obtains svcType value, i.e., PM included in the data for use in the theme pictures or BD for use in bells. The data stored in the storage unit 123 may be later used by the user as theme pictures or bells.

The key receiver 130 provides signals to the controller 110, wherein the signals are generated by a user operating the mobile telecommunication terminal to retrieve a menu for setting up a theme picture. The controller 110 displays in the display 150 a menu selection window for selecting the theme picture based on the signals inputted from the key receiver 130 (step 301).

The controller 110 detects if the selection has been made (step 302). If setting up the theme picture is selected, both data having an svcType field value of PM among VOD contents data and data for picture files are retrieved in the storage unit 123 (step 303). Next, a retrieved data selection window (step 304) is displayed on the display 150 so that the user may select a desired content.

The user's selection from the data displayed in the selection window is detected by the controller 110 (step 305). In case the data selected by the user are not the VOD contents, the data are transmitted to the decoding unit 140. The decoding unit 140 decodes the data transmitted from the controller 110 to set up the theme picture (step 306).

The controller 110 displays in the display 150 the data for use in theme pictures, which are set up by the user's selection, during a standby status of the mobile telecommunication terminal.

Based on a result of step 305, if the data selected by the user are the VOD contents, the controller 110 displays an audio data setup window for the user to determine whether an audio (sound) part in the VOD contents is included in the theme pictures (step 307). Moreover, the controller 110 detects if the data for use in theme pictures include the audio data (step 308).

Based on a result of step 308, if the data for use in theme pictures do not include the audio data by the user's selection, the VOD contents are transmitted to the decoding unit 140. The VOD contents transmitted from the controller 110 are decoded by the decoding unit 140. Further the speaker (SP) output in accordance with the user's setup (in case the audio part is not included) is turned off (step 310). The data for use in theme pictures, which are set up in the decoding unit 140, are displayed during standby status of the mobile telecommunication terminal on the display 150 (step 311).

Based on the result of step 308, if the data for use in theme pictures selected by the user include the audio data, the VOD contents data are transmitted to the decoding unit 140. The video data and audio data in the transmitted VOD contents data to set up theme pictures are decoded by the decoding unit 140. In this case, the speaker (SP) output is turned on (steps 309 and 311).

Referring back to the result of step 302, if the user selects a VOD contents menu, a window for making the VOD contents-related selection (e.g., opening VOD contents, a theme picture setup, a bell setup, and the like) is processed by the controller and displayed on the display 150 (step 312). The selection made by the user is detected by the controller 110 (step 313).

Thereafter, if the user selects to open the VOD contents, a VOD player stored in the code unit 121 is processed by the controller 110. As a result, the VOD player processes the VOD contents selected by the user to be displayed on the display 150 (step 314 and step 315).

However, if the user selects the theme picture setup menu, the user is returned to step 307 by the controller 110, and proceeds in manner described above.

Referring back to step 302, in case the menu for setting up the bell is selected, both data having an svcType field value of BD among VOD contents data and data for audio files are retrieved from the storage unit 123 (step 323) as shown in FIG. 4B. Next, the retrieved data are displayed as a retrieved data list selection window (step 324) so that the user may select a desired content from the menu.

The selection made by the user is detected by the controller 110 (step 325). In case the data selected by the user are not the VOD contents, the data are transmitted to the decoding unit 140. The data transmitted from the controller 110 to set up the bells are decoded by the decoder 140 (step 326).

However, if the data selected by the user are the VOD contents, a video data setup window for determining whether a video (picture) part in the VOD contents is included is displayed on the display 150 by the controller 110 (step 327). Thereafter, the controller 110 checks whether the data for use in bells include the video data (step 328).

Based on the result of step 328, if the data for use in bells for indicating an incoming call do not include the video data based on the user's selection, the VOD contents are transmitted to the decoding unit 140. The VOD contents transmitted from the controller 110 are decoded by the decoding unit 140. Thus, based on the user's selection, the video data are excluded during an incoming call (in case the video part is not included) (step 330). Thereafter, the decoded data for use in bells are set up as bells (step 331).

Referring back to step 328, if the data for use in bells include the video data, the VOD contents data including audio and video data are transmitted to the decoding unit 140 and are decoded by the decoding unit 140. The decoded video data are to be displayed on the display 150 when the mobile telecommunication terminal receives an incoming call (steps 329 and 331).

In the present invention, VOD contents can be highly utilized by using the VOD contents downloaded through a wireless network for use in theme pictures or bells. Thus, providing specialized wireless telecommunication services to users.

While the invention has been shown and described with respect to the preferred embodiments, it will be understood by those skilled in the art that various changes and modifications may be made without departing from the spirit and scope of the invention as defined in the following claims.

What is claimed is:

1. A method for setting up a theme picture of a mobile telecommunication terminal, comprising the steps of:
    (a) displaying a menu selection window for setting up the theme picture or electing a VOD (video-on-demand) content menu;
    (b) if setting up the theme picture is selected, retrieving theme picture data from a storage the mobile telecommunication terminal and providing a selection unit of the mobile telecommunication terminal and providing a selection window for a user to select data for a desired content from the retrieved data, the theme picture data including data for VOD content-related theme pictures each having a video and an audio part and data for non-VOD content-related theme pictures having no audio part;
    (c) if the selected data for the desired content is data for a VOD content-related theme picture, providing a setup window for determining whether to include an audio part in the theme picture to be set up;
    (d) if the audio part is determined to be included, decoding a video part and the audio part of the selected data for the VOD content-related theme picture to set up the theme picture;
    (e) if the audio part is determined not to be included, decoding only the video part of the selected data for the VOD content-related theme picture to set up the theme picture;
    (f) if the selected data for the desired content is data for a non-VOD content-related theme picture, decoding the selected data for the non-VOD content-related theme picture to set up the theme picture;
    (g) if the VOD content menu is selected in step (a), displaying a VOD content-related selection window which includes a menu for opening a VOD content or for selecting data for a VOD content-related theme picture having a video and an audio part;
    (h) if the menu for opening the VOD content is selected, displaying the VOD content selected by the user; and
    (i) if the data for the VOD content-related theme picture is selected in step (g), providing the setup window for determining whether to include the audio part in the theme picture to be set up; and repeating the steps of (d) and (e).

2. The method of claim 1 wherein the VOD content-related theme pictures include a svcType field, wherein the svcType field is an identifier for identifying the VOD content-related theme pictures used for setting up the theme pictures.

3. A method for setting up a bell of a mobile telecommunication terminal, comprising the steps of:

(a) displaying a menu selection window for setting up the bell or selecting a VOD (video-on-demand content menu;

(b) if setting up the bell is selected, retrieving bell data from a storage unit of the mobile telecommunication terminal and providing a selection window for a user to select data for a desired content from the retrieved data, the bell data including data for VOD content-related bells each having a video and an audio part and data for non-VOD content-related bells having no video part;

(c) if the selected data for the desired content is data for a VOD content-related bell, providing a setup window for determining whether to include a video part in the bell to be set up;

(d) if the video part is determined to be included, decoding the video part and an audio part of the selected data for the VOD content-related bell to set up the bell;

(e) if the video part is determined not to be included, decoding only the audio part of the selected data for the VOD content-related bell to set up the bell;

(f) if the selected data for the desired content is data for a non-VOD content-related bell, decoding the selected data for the non-VOD content-related bell to set up the bell;

(g) if the VOD content menu is selected in step (a), displaying a VOD content-related selection window which includes a menu for opening a VOD content or for selecting data for a VOD content-related bell having a video and an audio part;

(h) if the menu for opening the VOD content is selected, displaying the VOD content selected by the user; and (i) if the data for the VOD content-related bell is selected in step (g), providing the setup window for determining whether to include the video part in the bell to be set up; and repeating the steps of (d) and (e).

4. The method of claim 3, wherein the VOD content-related bells include a svcType field, wherein the svcType field is an identifier for identifying the VOD content-related bells used for setting up the bells.

* * * * *